(12) United States Patent
Blair

(10) Patent No.: US 10,882,250 B2
(45) Date of Patent: Jan. 5, 2021

(54) ADDITIVE MANUFACTURING APPARATUS

(71) Applicant: Xerox Corporation, Norwalk, CT (US)

(72) Inventor: Christopher D. Blair, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 236 days.

(21) Appl. No.: 16/132,788

(22) Filed: Sep. 17, 2018

(65) Prior Publication Data

US 2020/0086560 A1   Mar. 19, 2020

(51) Int. Cl.
*B33Y 50/00* (2015.01)
*B29C 64/176* (2017.01)
*B29C 64/209* (2017.01)
*B29C 64/393* (2017.01)
*B29C 64/295* (2017.01)
*B29C 33/44* (2006.01)
*B29C 48/92* (2019.01)
*B29C 48/355* (2019.01)
(Continued)

(52) U.S. Cl.
CPC .......... *B29C 64/176* (2017.08); *B29C 33/44* (2013.01); *B29C 37/0003* (2013.01); *B29C 48/355* (2019.02); *B29C 48/92* (2019.02); *B29C 64/171* (2017.08); *B29C 64/182* (2017.08); *B29C 64/209* (2017.08); *B29C 64/295* (2017.08); *B29C 64/379* (2017.08); *B29C 64/386* (2017.08); *B29C 64/393* (2017.08); *B33Y 10/00* (2014.12); *B33Y 30/00* (2014.12); *B33Y 40/00* (2014.12); *B33Y 50/02* (2014.12); *G05B 2219/49008* (2013.01); *G05B 2219/49016* (2013.01); *G05B 2219/49021* (2013.01)

(58) Field of Classification Search
CPC ... B29C 33/44; B29C 37/0003; B29C 48/355; B29C 48/92; B29C 64/171; B29C 64/176; B29C 64/182; B29C 64/209; B29C 64/295; B29C 64/379; B29C 64/386; B29C 64/393; B33Y 30/00; B33Y 50/00; B33Y 50/02; G05B 2219/49008; G05B 2219/49016; G05B 2219/49021
USPC ....... 425/135, 139, 140, 143, 162, 165, 375, 425/436 R, 439; 700/118, 119
See application file for complete search history.

(56) References Cited

U.S. PATENT DOCUMENTS 9,632,037 B2   4/2017   Chen et al.
9,649,814 B2   5/2017   Yeh
(Continued)

*Primary Examiner* — Leo B Tentoni
(74) *Attorney, Agent, or Firm* — Maginot Moore & Beck LLP

(57) ABSTRACT

An additive manufacturing system enables continual production of three-dimensional objects without operator intervention. The system is configured to form an object on a planar member, rotate the planar member 180° to enable gravity to move the object from the planar member to an object transport, which carries the object to a receptacle for storage and later processing. The opposite side of the planar member is then available for manufacture of another object and the planar member is again rotated following manufacture of the object so it can be removed and carried to the receptacle. The alternating formation of objects on opposite sides of the planar member continues until a predetermined number of objects has been made. The planar member can include one or more heaters to heat the surface on which an object is formed to facilitate release of the object once the planar member has been rotated.

8 Claims, 4 Drawing Sheets

(51) Int. Cl.
*B29C 64/171* (2017.01)
*B29C 64/182* (2017.01)
*B29C 64/386* (2017.01)
*B29C 64/379* (2017.01)
*B29C 37/00* (2006.01)
*B33Y 50/02* (2015.01)
*B33Y 10/00* (2015.01)
*B33Y 30/00* (2015.01)
*B33Y 40/00* (2020.01)

(56) References Cited

U.S. PATENT DOCUMENTS

| | | |
|---|---|---|
| 9,849,631 B1 | 12/2017 | Goss et al. |
| 2009/0033711 A1 | 2/2009 | Silverbrook |
| 2013/0073073 A1* | 3/2013 | Pettis ............... B33Y 30/00 700/119 |
| 2013/0313743 A1* | 11/2013 | Rockhold ............ B29C 64/393 425/135 X |
| 2014/0328963 A1* | 11/2014 | Mark ............... B29C 64/393 425/143 |
| 2015/0298393 A1 | 10/2015 | Suarez |
| 2015/0298396 A1 | 10/2015 | Chen et al. |
| 2016/0096326 A1* | 4/2016 | Naware ............... B29C 64/393 425/143 |
| 2016/0288415 A1 | 10/2016 | Fromm et al. |
| 2016/0288423 A1 | 10/2016 | Dufort et al. |
| 2017/0128987 A1* | 5/2017 | Dufort ............... B33Y 40/00 |

* cited by examiner

ADDITIVE MANUFACTURING APPARATUS

TECHNICAL FIELD

This disclosure is directed to additive manufacturing systems and, more particularly, to repetitive operation of such printers.

BACKGROUND

Three-dimensional printing, also known as additive manufacturing, is a process of making a three-dimensional (3D) solid object from a digital model of virtually any shape. Many three-dimensional printing technologies use an additive process in which an additive manufacturing device forms successive layers of an object on top of previously deposited layers. Some of these technologies use extruders that soften or melt extrusion material, such as ABS plastic, into thermoplastic material and then emit the thermoplastic material in a predetermined pattern to form successive layers of a three-dimensional object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single extruder that extrudes material through a single nozzle. The printhead moves in a predetermined path to emit the extrusion material onto selected locations of a support member or previously deposited layers of the three-dimensional printed object based on model data for the three-dimensional printed object. However, using an extruder with only a single nozzle to emit the extrusion material often requires considerable time to form a three-dimensional printed object. Additionally, an extruder with a larger nozzle diameter can form a three-dimensional printed object more quickly but loses the ability to emit extrusion material in finer shapes for higher detailed objects while nozzles with narrower diameters can form finer detailed structures but require more time to build the three-dimensional object.

To address the limitations of single nozzle extruders, multi-nozzle extruders have been developed. In some multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of the swath of the thermoplastic material extruded from the nozzles to be varied by changing the number of nozzles extruding material and selectively operating which nozzles extrude material. In extruders having different manifolds, each nozzle can extrude a different material with the fluid path from one of the manifolds to its corresponding nozzle including a valve that can be operated to open and close the nozzle selectively. This ability enables the composition of the material in a swath to vary as well as the shape of the swath of extrusion material extruded from the nozzles to be varied. Again, these variations are achieved by changing the number of nozzles extruding material and the nozzles operated to extrude material. These multi-nozzle extruders enable different materials to be extruded from different nozzles to form an object without having to coordinate the movement of different extruder bodies. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to infill areas of an object, such as its interior regions, quickly.

Many 3D objects have features and appendages that are cantilevered above the printing surface and cannot be printed using a simple layer-by-layer decomposition of the object. When forming these objects, some form of support structure must be formed so the initial layers of the features and appendages can be built on the support rather than in midair. In some cases, this support is formed with a material that is different than the material used to form the part and the support material is chosen to be a material that can be easily removed from the object. With manufacturing systems that use single nozzle extruders, another single nozzle extruder is provided to form the support structures with the different material; however, the complication of adding another extruder and, in most cases, needing additional time to operate the additional extruder to produce the support structure material can be expensive in time and resources.

Environments for additive manufacturing systems are centralized and require operator intervention between jobs. The printers are often located inside lab areas that are not always accessible during evening hours or weekends. Since the manufacture of some objects requires tens of hours and some can require multiple days, the manufacturing process continues without observation and once the process is completed, the system sits idle until an operator returns to retrieve the manufactured object for removal of the support structures and to prepare the system for production of the next object. Thus, improving the operational environments of additive manufacturing systems to enable a more continual operation of the systems without requiring the presence of human operators during three-dimensional object formation processes would be beneficial.

SUMMARY

A new additive manufacturing system enables a more continual operation of the system without requiring the presence of human operators for continuing with another three-dimensional object formation process. The system includes an extruder configured to emit an extrusion material from one or more nozzles, a planar member positioned opposite the extruder to receive emitted extrusion material from the extruder, an object transport positioned opposite from the planar member so the planar member is between the extruder and the object transport, a plurality of actuators, at least one actuator being operatively connected to the object transport, at least one actuator being operatively connected to the extruder, and at least one actuator being operatively connected to the planar member, and a controller operatively connected to the plurality of actuators and the extruder. The controller is configured to operate the at least one actuator operatively connected to the extruder to move the extruder in a plane parallel to the planar member and operate the extruder while the extruder is moving to emit extrusion material from the nozzles of the extruder to form layers of an object on the planar member, operate the at least one actuator operatively connected to the planar member to rotate the planar member about an axis that is parallel to the plane of extruder movement to enable gravity to release the object from the planar member so the object lands on the object transport, and operate the at least one actuator operatively connected to the object transport to displace the object from a position opposite the planar member.

A new method of operating an additive manufacturing system enables a more continual operation of the systems without requiring the presence of human operators for continuing with another three-dimensional object formation process. The method includes operating with a controller at least one actuator operatively connected to an extruder to move the extruder in a plane parallel to a planar member positioned opposite the extruder, operating with the controller the extruder while the extruder is moving to emit extrusion material from one or more nozzles of the extruder to form layers of an object on the planar member, operating with the controller the at least one actuator operatively connected to the planar member to rotate the planar member about an axis that is parallel to the plane of extruder movement to enable gravity to release the object from the planar member so the object lands on an object transport, and operate with the controller at least one actuator operatively connected to the object transport to displace the object from a position opposite the planar member.

BRIEF DESCRIPTION OF THE DRAWINGS

The foregoing aspects and other features of an additive manufacturing system and operation of the system that enables a more continual operation of the systems without requiring the presence of human operators for continuing with another three-dimensional object formation process are explained in the following description, taken in connection with the accompanying drawings.

DETAILED DESCRIPTION

Figure 1:
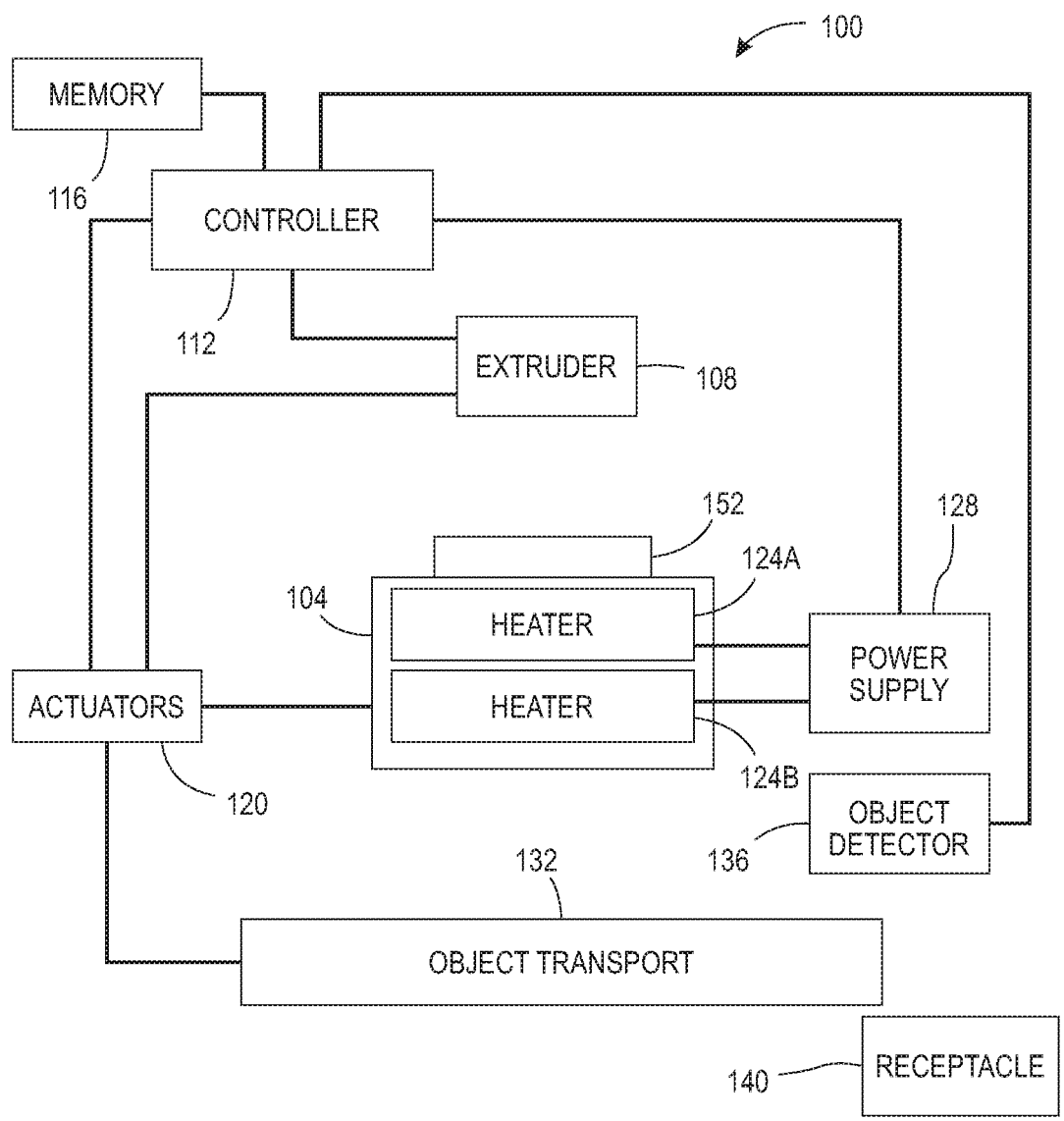
FIG. 1 is a block diagram of an additive manufacturing system that enables continual operation of the system without operator intervention between jobs.

For a general understanding of the environment for the system and method disclosed in this document as well as the details for the system and method, reference is made to the drawings. In the drawings, like reference numerals designate like elements.

As used herein, the term "extrusion material" refers to a material that is emitted from an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Build materials also include other materials that do not require heating but are later hardened by exposure to air or energy, such as UV light or heat. These types of materials include food materials. For example, chocolate and cheese can be extruded to form objects in various shapes, such as bunnies, eggs, or the like. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the extrusion material can be supplied as filament to the heaters, other extrusion material supplies can be used, such as particulate or spherical ball extrusion materials. The heater softens or melts the solid extrusion material to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in an extruder during operation of an additive manufacturing system. The melted extrusion material is also denoted as "thermoplastic material" in this document. As those of skill in the art recognize, certain amorphous extrusion materials do not transition to a pure liquid state during operation of the printer.

As used herein, the terms "extruder" refers to a component of a printer that pressurizes extrusion material in a single chamber so the extrusion material migrates to a manifold connected to one or more nozzles for emission. The extrusion material can be at room temperature for some materials, such as epoxies and glues. Other extrusion materials are heated to a temperature that melts or softens the extrusion material so it flows to the manifold connected by passageways to one or more nozzles. The multi-nozzle extruders described in this document include a valve assembly that can be electronically operated to move pins to block or enable extrusion material flow to the nozzles so extrusion material is emitted from the nozzles selectively and independently. A controller operates the valve assembly to connect the nozzles in a plurality of nozzles to the manifold independently and emit the extrusion material. As used herein, the term "nozzle" refers to an orifice in an extruder housing that is fluidly connected to the manifold in an extruder and through which extrusion material is emitted towards a material receiving surface. During operation, the nozzle can extrude a substantially continuous linear swath of the extrusion material along the process path of the extruder. The diameter of the nozzle affects the width of the line of extruded material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of extrusion material for delivery to one or more nozzles in the extruder during a three-dimensional object printing operation. As used herein, the term "swath" refers to any pattern of multiple extrusion material ribbons emitted simultaneously from multiple nozzles of a multi-nozzle extruder onto a material receiving surface during a three-dimensional object printing operation. Single nozzle extruders are unable to form swaths as they can produce only a single bead of extrusion. Common swaths include straight-line linear arrangements of extrusion material and curved swaths. In some configurations, the extruder extrudes the material in a continuous manner to form the swath with a contiguous mass of the extrusion material in both process and cross-process directions, while in other configurations the extruder operates in an intermittent manner or at some angle of movement that forms smaller groups of extruded material that are discontinuous in either a process or cross-process direction and are arranged along a linear or curved path. The additive manufacturing system forms various structures using combinations of different swaths of the extrusion material. Additionally, a controller in the additive manufacturing system uses object image data and extruder path data that correspond to different swaths of extrusion material prior to operating a multi-nozzle extruder to form each swath of extrusion material.

As used herein, the term "process direction" refers to a direction of relative movement between an extruder and a material receiving surface that receives extrusion material emitted from one or more nozzles in the extruder. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion. Additionally, one or more actuators are operatively connected to the extruder, the platform on which a three-dimensional object is formed, or both to move the extruder and the platform toward and away from one another. This type of movement is sometimes referred to as vertical movement or movement of the extruder, the platform, or both along the Z-axis.

As used herein, the term "cross-process direction" refers to an axis that is perpendicular to the process direction and parallel to the extruder faceplate and the material receiving surface. The process direction and cross-process direction refer to the relative path of movement of the extruder and the surface that receives the extrusion material emitted from one or more nozzles. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of extrusion material emitted from multiple nozzles in a multi-nozzle extruder as the lines form a swath.

During operation of the additive manufacturing system, an extruder moves in the process direction along both straight and curved paths relative to a surface that receives material extruded during the three-dimensional object formation process. Additionally, an actuator in the system optionally rotates the multi-nozzle extruder about the Z axis to adjust the effective cross-process distance that separates nozzles in the multi-nozzle extruder to enable the extruder to form two or more lines of extrusion material with predetermined distances between each line of the extrusion material. The multi-nozzle extruder moves both along the outer perimeter to form outer walls of a two-dimensional region in a layer of the printed object and within the perimeter to fill all or a portion of the two-dimensional region with the extrusion material.

FIG. 1 depicts a three-dimensional object additive manufacturing system 100 that is configured to operate the system continual without operator intervention. The system 100 includes a build platform 104, a multi-nozzle extruder 108, a controller 112, a memory 116, a plurality of actuators 120, a pair of heaters 124A and 124B, a power supply 128, an object transport 132, an object detector 136, and a parts bin 140. The actuators 120 are operatively connected to the extruder 108, the platform 104, and the object transport 132. The heaters can be electrical resistance heaters, inductive heaters, or other known heaters useful for temperature regulation of build platform surfaces in additive manufacturing systems. The object transport 132 can be a conveyor having an endless belt wrapped about rollers for rotation about the rollers when the controller 112 operates one of the actuators 120 to rotate at least one of the conveyor rollers. Alternatively, the object transport can be a bed of rollers, at least one of which is driven by an actuator 120. Other known transports can also be used. Other actuators 120 are operatively connected to the extruder 108 to move the extruder to different locations in a two-dimensional plane (the "X-Y plane") that is parallel to the face of the extruder 108 and the surface of platform 104 opposite the extruder 108 so the extruder can form patterns of extrusion material on the platform 104, previously formed object layers, or previously formed support structures to form a three-dimensional printed object, such as the object 152. While the actuators are being operated to move the extruder 108, the controller 112 accesses object layer data from the memory 116 to open and close nozzles in the faceplate of the extruder 108 to emit ribbons of extrusion material for object and support structure formation on the platform 104. The extruded patterns include both outlines of one or more regions in the layer and extruded swaths of the extrusion material that fill in the regions within the outline of extrusion material patterns. Between formation of object layers, the controller 112 operates one of the actuators 120 to move the extruder away from the platform in a direction that is perpendicular to the surface of the platform 104 on which the object is being formed. This operation changes the distance between the extruder 108 and the platform 104 to ensure that the nozzles in the extruder 108 remain at a suitable height to extrude extrusion material onto the object 152 as the object is formed during the manufacturing process. Another actuator in the actuators 120 can be operatively connected to the extruder 108 and configured to rotate the extruder 108 about the axis between the face of the extruder and the center of the platform for some embodiments of the system 100. This rotational movement of the extruder 108 can be used to control the separation between nozzles in the extruder 108, although some printhead embodiments do not require rotation during the manufacturing process. The actuators 120 can be electromechanical actuators, such as electric motors, stepper motors, or any other suitable electromechanical device. In the illustrative embodiment of FIG. 1, the additive manufacturing system 100 is depicted during formation of a three-dimensional printed object 152 that is formed from a plurality of layers of an extrusion material.

The platform 104 is a planar member, such as a glass plate, polymer plate, or foam surface, which supports the three-dimensional printed object 152 during the production process. One or more supplies of extrusion material (not shown) provide extrusion material to one or more manifolds in the extruder 108 in a one-to-one correspondence. If more than one manifold is provided, then different groups of nozzles are connected to different manifolds in the extruder 108 so the extruder can form swaths with different extrusion materials. For example, some of the nozzles can be fluidly connected to a manifold holding build material for forming the object 152 and another group of nozzles can be fluidly connected to another manifold in which support material is housed. In other embodiments, multiple build materials and multiple support materials can be supplied to groups of nozzles in the extruder 108 through different manifolds.

The controller 112 is a digital logic device such as a microprocessor, microcontroller, field programmable gate array (FPGA), application specific integrated circuit (ASIC), or any other digital logic that is configured to operate the system 100. In the system 100, the controller 128 is operatively connected to one or more actuators 120 to control the rotation of the platform 104, as described below, the movement of the extruder 108, and the driving of the object transport 132.

The controller 112 is also operatively connected to a memory 116. In the embodiment of the system 100, the memory 116 includes volatile data storage devices, such as random access memory (RAM) devices, and non-volatile data storage devices such as solid-state data storage devices, magnetic disks, optical disks, or any other suitable data storage devices. The memory 116 stores programmed instructions, control data, and three-dimensional (3D) object image data. The controller 112 executes the stored program instructions and uses the object image data to operate the components in the system 100 to form the three-dimensional printed object 152 and print two-dimensional images on one or more surfaces of the object. The 3D object image data stored in the memory 116 includes, for example, a plurality of two-dimensional image data patterns that correspond to each layer of extrusion material that the system 100 forms during the three-dimensional object manufacturing process. The extruder path control data stored in the memory 116 includes a set of geometric data or actuator control commands that the controller 112 processes to control the path of movement of the extruder 108 using some of the actuators 120 and to control the orientation of the extruder 108 in some embodiments. Thus, the controller 112 operates some of the actuators to move the extruder 108 and activates and deactivates different nozzles in the extruder 108 to form arrangements of the extrusion material in each layer of the three-dimensional printed object 152.

Figure 2:
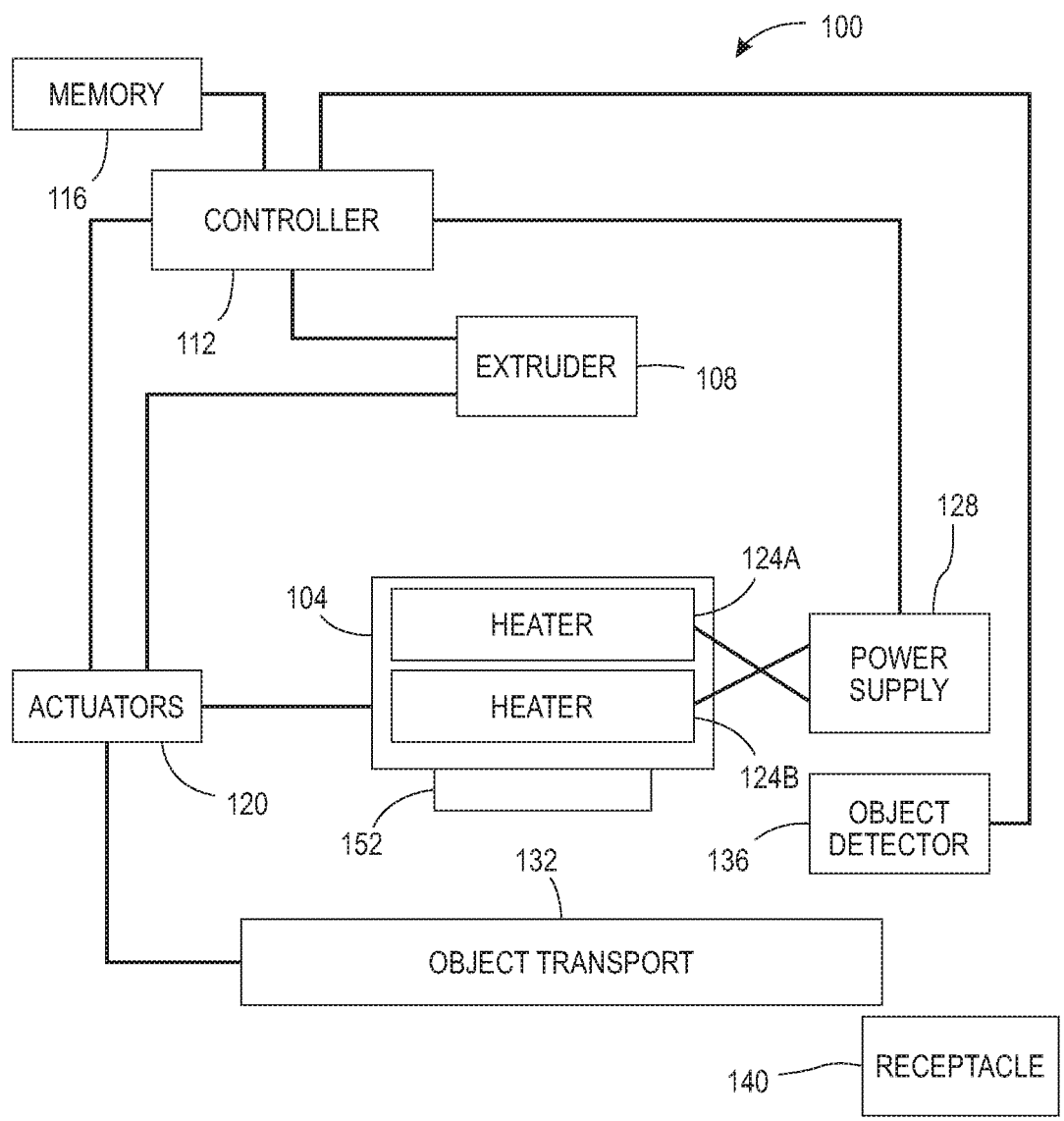
FIG. 2 is a is a block diagram of an additive manufacturing system in FIG. 1 after the build platform has been inverted for automatic removal of the object and the commencement of the next object building process.

To enable the system 100 to be used for continual manufacture of objects, the system 100 also includes a power supply 128 that is operatively connected to the heaters 124A and 124B in the platform 104, an object detector 136, and an object receptacle 140. The controller 112 is configured with programmed instructions stored in the memory 116 to detect the end of the manufacturing process for the object 152 and then operate one of the actuators 120 to rotate the platform 180° about an axis parallel to the surface on which the object 152 was formed. This operation results in the object 152 being opposite the object transport 132 as shown in FIG. 2. The controller 112 then executes programmed instructions to operate the power supply 128 to connect electrical power to the heater 124A so the heater begins to produce heat. As the temperature increases on the side of the platform to which the object 152 clings, the layer of support material formed on the platform to help adhere the object 152 to the platform 104 begins to soften. Eventually, the object 152 releases from the platform 104 and falls onto the object transport 132. The falling of the object 152 from the platform 104 is detected by the object detector 140, which generates a signal indicating the object 152 has released from the platform 104 and this signal is received by the controller 112. In response to this signal, the controller 112 executes programmed instructions that cause it to disconnect electrical power from the heater 124A and to operate one of the actuators 120 to drive the object transport 132 to carry the object 152 to the parts bin 140 so the object 152 can fall into the receptacle 140. The object is held in the receptacle for later retrieval and further processing, such as the removal of support material from the object. The controller 112 then executes programmed instructions that enable the controller to operate the components of the system 100 so another object is formed on the side of the platform 104 that is opposite of the side on which the object 152 was formed. When that object is made, the controller 112 operates the actuator 120 that rotates the platform 104 in the reverse direction to untangle the cables to the heaters and position the newly manufactured object opposite the object transport 132 and to return the side of the platform that supported the object 152 to a position opposite the extruder 108. The controller then operates the power supply 128 to energize the heater 124B until the object detector 136 detects the release of the new object and generates the signal so the controller 112 disconnects the electrical supply 128 from heater 124B and operates the object transport 132 to place the newly made part in the receptacle 140. This process can continue for the formation of multiple part without operator intervention until the receptacle is full or until a predetermined number of parts have been made.

The object detector 136 can be a camera and the controller 112 can be configured with programmed instructions to analyze the image data from the camera to detect a falling object once the platform 104 is rotated and electrical power is applied to the appropriate heater. Alternatively, the object detector 136 can be a light source, such as a laser, located at one end of the object transport 132 and a light receiver located at the other end. The dropping of the object from the platform 104 breaks the reception of the laser beam at the light receiver and, in response to the detection of this breakage, the light receiver generates the signal indicative of the object falling for the controller 112. In another alternative embodiment, the object detector 136 can be a weight sensor located within the object transport 132. The weight sensor is configured to generate a signal indicative of the weight of the object once the object is released onto the object transport 132. The object data used to operate the extruder 108 and form the object can also be used by the controller 112 to identify a weight for the object. The weight indicated by the signal from the weight sensor is compared to this identified weight and, as long as the identified weight and the weight indicated by the sensor signal are within a predetermined range, the controller determines the object as been released from the platform 104. Other types of object detectors include infra-red detectors, sonic detectors, mechanical switches, or the like.

Figure 3:
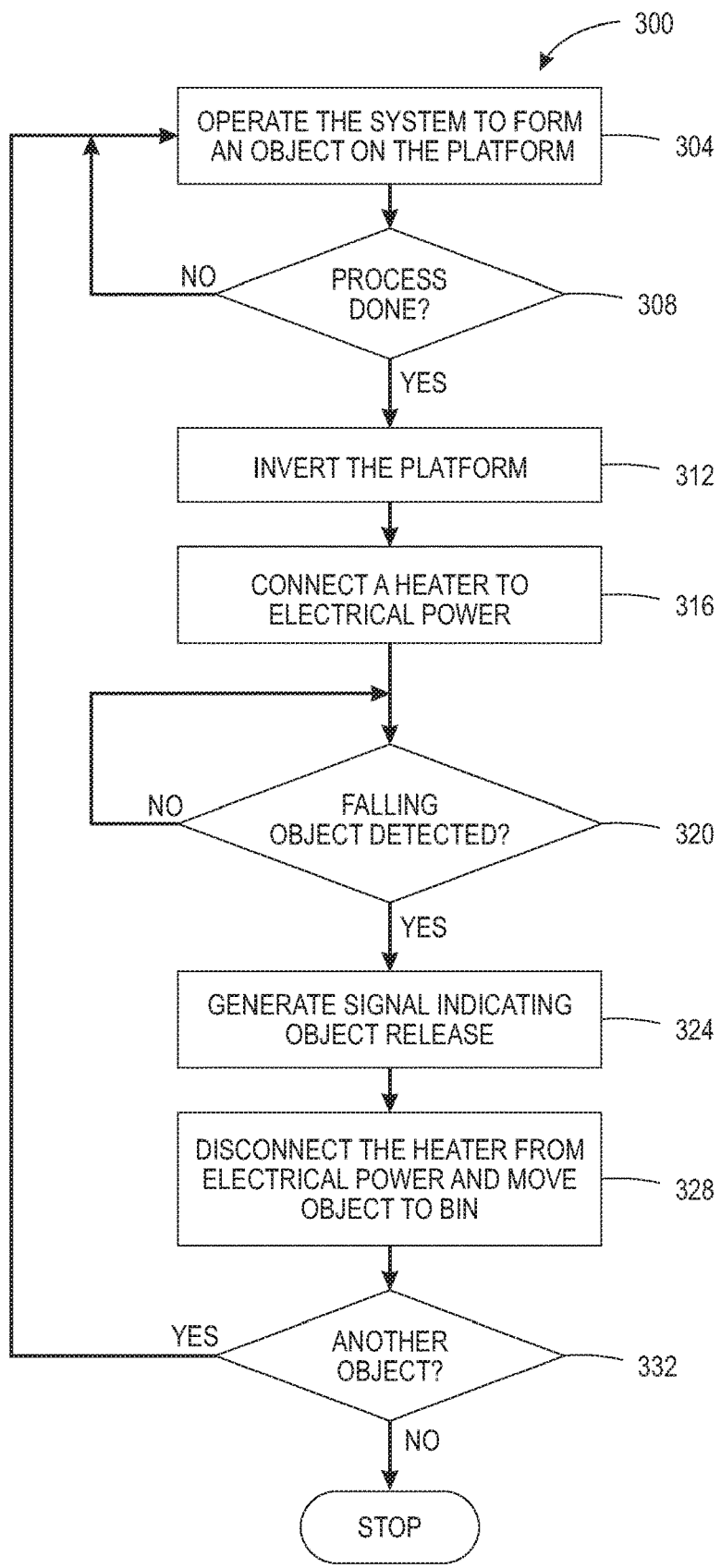
FIG. 3 is a flow diagram of a process for operating the system of FIG. 1.

A process 300 for operating the system 100 is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 112 noted above can be such a controller or processor. Alternatively, the controller can be implemented with more than one processor and associated circuitry and components, each of which is configured to form one or more tasks or functions described herein. Additionally, the steps of the process may be performed in any feasible chronological order, regardless of the order shown in the figures or the order in which the processing is described.

While the system described above utilizes temperature to reduce the adherence of the object to the platform and gravity to pull the object away from the platform, other forces could be used. For example, an airstream generator, a mechanical pusher, a robotic articulated arm, a water jet, or other mechanical or pneumatic force could be used to dislodge the object from the object and gravity assist or complete the release of the object. Because many platforms in additive manufacturing system incorporate heaters for various reasons, operating the heaters to a temperature that facilitates release of the object under the effect of gravity is an economic alternative.

The process 300 begins with the manufacture of an object on the platform in a known manner (block 304). When the end of the object manufacture is detected (block 308), the platform on which the object was formed is rotated 180° to position the object opposite the conveyor (block 312). A heater in the platform is connected to electrical power so the heater begins to produce heat (block 316). When the object is released from the platform and falls onto the conveyor, the falling object is detected by the object detector (block 320) and a signal is generated indicating the object has released from the platform (block 324). In response to this signal, the controller disconnects electrical power from the heater and operates the conveyor to carry the object to the parts bin so the object can fall into the bin (block 328). If another object is to be formed (block 332), then the process continues with formation of an object on the opposite side of the platform (block 304) and the rest of the process is performed for object removal with the exception that the inversion of the platform (block 312) is done in the opposite direction, if necessary to prevent cable twisting. The process 300 continues until no more parts are to be made (block 332) and then the system stops.

Figure 4:
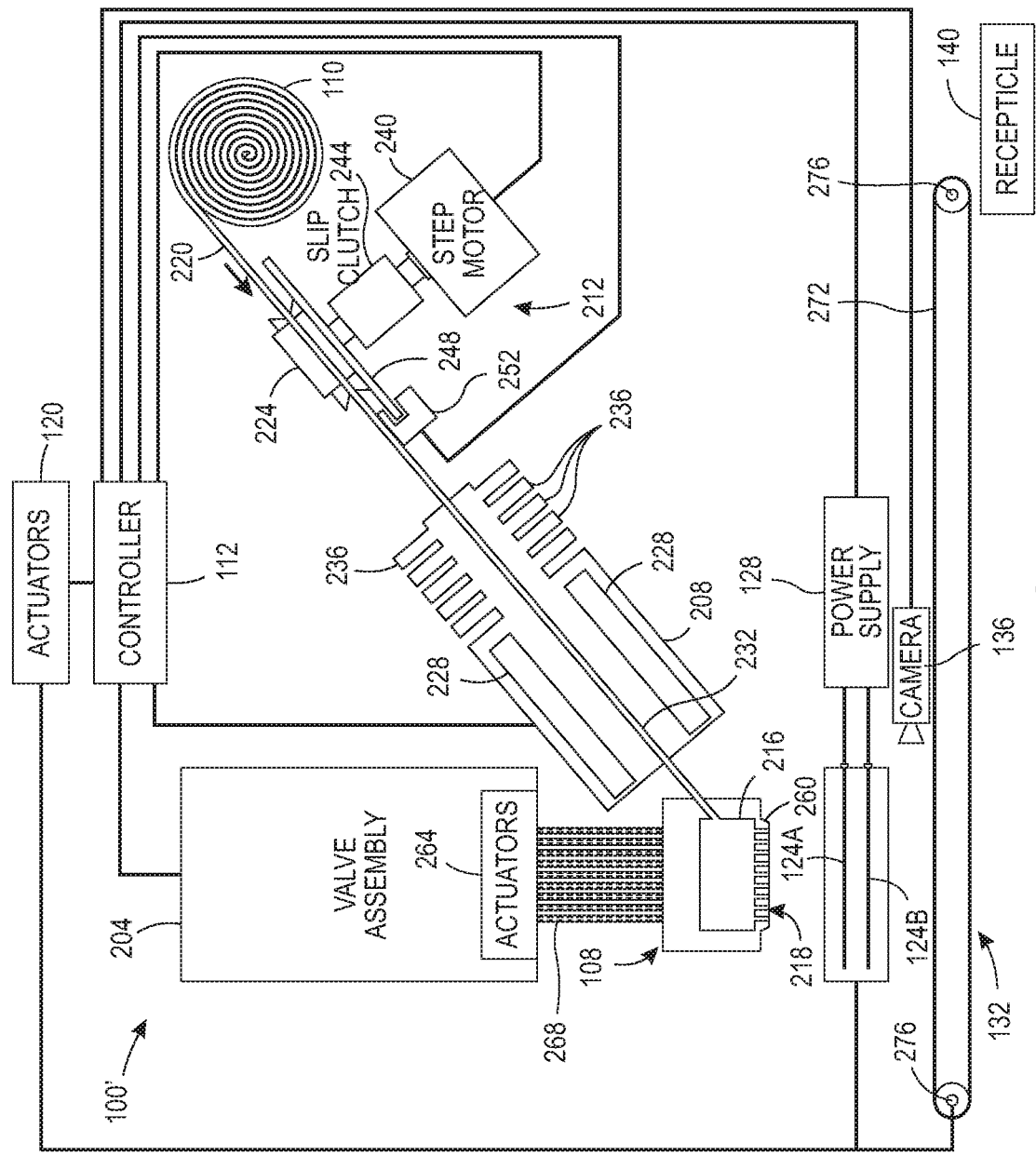
FIG. 4 is an embodiment of the system shown in FIG. 1 and FIG. 2.

FIG. 4 depicts one embodiment of an additive manufacturing system 100' having a multi-nozzle extruder head 108 that can be continually operated to form objects. Like reference numbers are used to identify like components in the embodiment. The extruder head 108 extrudes an extrusion material through nozzles 218 in a planar member, sometimes called a faceplate, 260. Only one manifold 216 is shown in FIG. 4 to simplify the figure, but the extruder head 108 can have a plurality of manifolds 216. In one embodiment, each manifold 216 in the extruder head 108 is operatively connected to a different heater 208 that is fed by a different extrusion material supply 110 in a one-to-one-to-one correspondence. In the extruder head 108, each nozzle 218 is fluidly connected to only one of the manifolds within the extruder head 108 so each nozzle can extrude a material that is different than the materials extruded from nozzles connected to other manifolds. Extrusion from each nozzle is selectively and independently activated and deactivated by controller 112 operating the actuators 264 that are operatively connected to the pins within the sleeves 268 to reciprocate the pins within the sleeves, which are hollow members. The actuators, pins, and sleeves form a plurality of valves that are arranged in a one-to-one-to-one correspondence with each other and with a nozzle in the faceplate. A distal end of each nozzle 218 is flush with the faceplate 260 to enable the faceplate 260 to be used to shape swaths of the materials in an object. The pins within the sleeves 268 are elongated solid members that extend from the actuator to the nozzle openings and are moved to allow material to flow selectively from the nozzles. The flow of material is terminated when an actuator of a valve is operated by the controller to move the pins into engagement with the nozzles and the material flows when the actuator is operated to retract the pins from the nozzles.

The controller 112 is a digital logic device such as a microprocessor, microcontroller, field programmable gate array (FPGA), application specific integrated circuit (ASIC) or any other digital logic that is configured to operate the printer 100'. In the printer 100, the controller 112 is operatively connected to one or more actuators 120 that control the movement of a support member that supports an object being formed with material extruded from the extruder head 108. The controller 112 is also operatively connected to a memory that includes volatile data storage devices, such as random access memory (RAM) devices, and non-volatile data storage devices such as solid-state data storage devices, magnetic disks, optical disks, or any other suitable data storage devices. The memory stores programmed instruction data and three-dimensional (3D) object image data. The controller 112 executes the stored program instructions to operate the components in the printer 100' to form a three-dimensional printed object on the support member 104 and to form support structures that support object features that extend from the object. The support structures can be formed with the same material as the object or, if multiple manifolds are included in the extruder head as explained above, the support structures can be formed with material different than the material used to form the object. The 3D object image data includes, for example, a plurality of two-dimensional image data patterns that correspond to each layer of extruded material that the printer 100 forms during the three-dimensional object printing process. The extruder path control data include a set of geometric data or actuator control commands that the controller 112 processes to control the path of movement of the extruder head 108 using the actuators 120 and to control the orientation of the extruder head 108 and the valve assembly 204. The extruder head 108 and the valve assembly 204 are collectively called an extruder in this document. The controller 112 operates the actuators to move the extruder head 108 above the support member as noted above while the extruder extrudes material to form an object and support structures.

The system 100' of FIG. 4 also includes an extrusion material dispensing system 212 for each heater 208 that is connected to a manifold 216 in the extruder head 108. The extrusion material from each separate supply 110 is fed to the corresponding heater 208 at a rate that maintains the pressure of the thermoplastic material in the manifold 216 connected to the heater 208 within a predetermined range during operation of the system 100'. The dispensing system 212 is one embodiment that is suitable for regulating pressure of the material in each manifold of the extruder head 108. Additionally, the controller 112 is operatively connected to an actuator in each dispensing system 212 to control the rate at which the dispensing system 212 delivers extrusion material from a supply 110 to the heater 208 fed by the supply. The heater 208 softens or melts the extrusion material 220 fed to the heater by the drive roller 224. Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 4 depicts a feed system that uses an electromechanical actuator and the driver roller 224 as a mechanical mover to move the filament 220 into the heater 208, alternative embodiments of the dispensing system 212 use one or more actuators to operate a mechanical mover in the form of a rotating auger or screw. The auger or screw moves solid phase extrusion material from a supply 110 in the form of extrusion material powder or pellets into the heater 208.

In the embodiment of FIG. 4, each heater 208 has a body formed from stainless steel that includes one or more heating elements 228, such as electrically resistive heating elements, which are operatively connected to the controller 112. Controller 112 is configured to connect the heating elements 228 to electrical current selectively to soften or melt the filament of extrusion material 220 in the channel or channels within the heater 208. While FIG. 4 shows heater 208 receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening other than the connection to the manifold 216, which maintains a temperature that keeps the extrusion material in a thermoplastic state as it enters the manifold. The extruder head 108 can also include additional heating elements to maintain an elevated temperature for the thermoplastic material within each manifold within the extruder head. In some embodiments, a thermal insulator covers portions of the exterior of the extruder head 108 to maintain a temperature within the manifolds within the extruder head. Again, the regions around the nozzles are maintained at a temperature that keeps the material in a thermoplastic state so it does not begin solidifying as it travels to the distal ends of the nozzles 218 in the faceplate 260.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device that applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within the constraints of the strength of the filament no matter how frequently, how fast, or how long the actuator 240 is driven. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 112 receives this signal to identify the speed of the roller 224. The controller 112 is further configured to adjust the signal provided to the actuator 240 to control the speed of the actuator. When the controller is configured to control the speed of the actuator 240, the controller 112 operates the actuator 240 so its average speed is slightly faster than the rotation of the roller 224. This operation ensures that the torque on the drive roller 224 is always a function of the slip clutch torque.

The controller 112 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 112 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 112 identifies an error from this signal with reference to the differential set point stored in memory and adjusts the signal output by the controller to operate the actuator 240. Alternatively, the controller 112 can alter the torque level for the slip clutch or the controller 112 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of material required in the manifold for adequate formation of the object. These print conditions include the type of extrusion material being fed to the extruder, the temperature of thermoplastic material being emitted from the extruder, the speed at which the extruder is being moved in the X-Y plane, the position of the feature being formed on the object, the angle at which the extruder is being moved relative to the platform, and the like.

As described previously, the system 100' also includes a power supply 128 that is operatively connected to the heaters 124A and 124B in the platform 104, an object detector 136, which is a camera in this embodiment, an object transport 132, which is a conveyor belt in this embodiment, and an object receptacle 140. The controller 112 is configured with programmed instructions stored in the memory 116 to detect the end of the manufacturing process for an object on the support member 104 and then operate one of the actuators 120 to rotate the platform 180° about an axis parallel to the surface on which the object was formed. The controller 112 then executes programmed instructions to operate the power supply 128 to connect electrical power to the heater 124A so the heater begins to produce sufficient heat to soften the support material holding the object to the platform 104 so the object 152 falls under the effect of gravity onto the endless belt 272 that is wrapped around the roller 276 to form a conveyor for the object transport 132. Camera 136 generates image data of the falling of the object from the platform 104 and this image data is processed by the controller 112. After determining the object has fallen from the platform 104 from the image data, the controller 112 executes programmed instructions that cause it to disconnect electrical power from the heater 124A and to operate one of the actuators 120 to drive at least one of the rollers 276 to rotate the belt about the roller and carry the object to the parts bin 140 so the object can fall into the receptacle 140. The object is held in the receptacle for later retrieval and further processing, such as the removal of support material from the object. The controller 112 then executes programmed instructions that enable the controller to operate the components of the system 100' so another object is formed on the side of the platform 104 that is opposite of the side on which the previous object was formed. When that object is made, the controller 112 operates the actuator 120 that rotates the platform 104 in the reverse direction to untangle the cables to the heaters and position the newly manufactured object opposite the conveyor 132 and to return the side of the platform that supported the previous object to a position opposite the extruder 108. The controller then operates the power supply 128 to energize the heater 124B until the controller 112 determines the image data from the camera 136 indicates the object has been released. The controller 112 then disconnects the electrical supply 128 from heater 124B and operates the conveyor 132 to place the newly made part in the receptacle 140. This process can continue for the formation of multiple part without operator intervention until the receptacle is full or until a predetermined number of parts have been made.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An additive manufacturing system comprising:
   an extruder configured to emit an extrusion material from one or more nozzles;
   a planar member positioned opposite the extruder to receive emitted extrusion material from the extruder;
   an object transport positioned opposite from the planar member so the planar member is between the extruder and the object transport;
   a plurality of actuators, at least one actuator being operatively connected to the object transport, at least one actuator being operatively connected to the extruder, and at least one actuator being operatively connected to the planar member;
   a pair of heaters positioned within the planar member, one heater is positioned to heat one surface of the planar member that is parallel to a plane in which the extruder moves and the other heater is positioned to heat an opposite surface of the planar member that is also parallel to the plane in which the extruder moves; and
   an electrical power supply operatively and independently connected to the two heaters; and
   a controller operatively connected to the plurality of actuators and the extruder, the controller being configured to:
      operate the at least one actuator operatively connected to the extruder to move the extruder in the plane parallel to the planar member and operate the extruder while the extruder is moving to emit extrusion material from the nozzles of the extruder to form layers of an object on the planar member;
      operate the at least one actuator operatively connected to the planar member to rotate the planar member about an axis that is parallel to the plane of extruder movement to enable gravity to release the object from the planar member so the object lands on the object transport;
      operate the at least one actuator operatively connected to the object transport to displace the object from a position opposite the planar member; and
      operate the electrical power supply selectively to connect the one heater to electrical power to heat the planar member to a temperature that releases the object from the planar member after the planar member has been rotated and when the object is formed on the one surface of the planar member and to connect the other heater to electrical power after the planar member is rotated and when the object is formed on the opposite surface of the planar member.

2. The additive manufacturing system of claim 1 further comprising:
   an object detector configured to detect the object moving from the planar member to the object transport and to generate a signal indicative of the object moving from the planar member to the object transport; and
   the controller being operatively connected to the object detector to receive the signal generated by the object detector, the controller being further configured to operate the at least one actuator operatively connected to the object transport when the controller receives from the object detector the signal indicative of the object moving from the planar member to the object transport.

3. The additive manufacturing system of claim 2 wherein the object detector is a camera that generates image data of the object moving from the planar member to the object transport; and the controller is further configured to:
   detect the object moving from the planar member to the object transport from the image data.

4. The additive manufacturing system of claim 2, the object detector further comprising:
   a light source and a light receiver, the light source being positioned to direct light in a plane parallel to the planar member to the light receiver, the light source and the light receiver being positioned to enable the object moving from the planar member to the object transport to interrupt reception of the light by the light receiver, and the light receiver being configured to generate the signal indicative of the object moving from the planar member to the object transport when the light reception is interrupted.

5. The additive manufacturing system of claim 2, the object detector being a weight sensor positioned to generate a signal indicative of a weight of the object after the object has moved from the planar member to the object transport; and
   the controller is operatively connected to the weight sensor to receive the signal indicative of the weight of the object, the controller being further configured to identify a weight of the object from data used to operate the extruder during formation of the object, to compare the identified weight to the weight indicated by the signal from the weight sensor, and to operate the at least one actuator operatively connected to the object transport when the identified weight and the weight indicated by the signal are within a predetermined range of one another.

6. The additive manufacturing system of claim 2 further comprising:
- a receptacle positioned at one end of the object transport;
- the object transport further comprising:
  - a plurality of rollers, at least one of the rollers being operatively connected to the at least one actuator operatively connected to the object transport; and
  - an endless belt wrapped about the plurality of rollers; and
- the controller being further configured to operate the at least one actuator operatively connected to the at least one roller to move the endless belt about the plurality of rollers and carry the object from a position opposite the planar member to a position where the object falls into the receptacle.

7. The additive manufacturing system of claim 1 wherein each heater is an electrical resistance heater.

8. The additive manufacturing system of claim 1 wherein each heater is an inductive heater.

* * * * *